United States Patent
Priyadarshi et al.

(10) Patent No.: US 10,379,863 B2
(45) Date of Patent: Aug. 13, 2019

(54) SLICE CONSTRUCTION FOR PRE-EXECUTING DATA DEPENDENT LOADS

(71) Applicant: QUALCOMM Incorporated, San Diego, CA (US)

(72) Inventors: Shivam Priyadarshi, Morrisville, NC (US); Rami Mohammad A. Al Sheikh, Morrisville, NC (US); Brandon Dwiel, Jamaica Plain, MA (US); Derek Hower, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/712,119

(22) Filed: Sep. 21, 2017

(65) Prior Publication Data

US 2019/0087192 A1    Mar. 21, 2019

(51) Int. Cl.
*G06F 9/38* (2018.01)
*G06F 9/30* (2018.01)
*G06F 9/32* (2018.01)

(52) U.S. Cl.
CPC ........ *G06F 9/3802* (2013.01); *G06F 9/30043* (2013.01); *G06F 9/325* (2013.01); *G06F 9/383* (2013.01); *G06F 9/3808* (2013.01); *G06F 9/3832* (2013.01); *G06F 9/3838* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,928,645 B2 | 8/2005 | Wang et al. | |
| 6,959,435 B2 * | 10/2005 | Ju | G06F 8/4451 712/207 |
| 7,458,065 B2 * | 11/2008 | Sanchez | G06F 9/4843 717/131 |

(Continued)

OTHER PUBLICATIONS

Wang, H. etal., Speculative Precomputation: Exploring the Use of Multithreading for Latency, Intel Technology Journal Q1, vol. 6, Issue 1, pp. 1-15. (Year: 2002).*

(Continued)

*Primary Examiner* — Eric Coleman
(74) *Attorney, Agent, or Firm* — MG-IP Law, P.C.

(57) ABSTRACT

Systems and methods for constructing an instruction slice for prefetching data of a data-dependent load instruction include a slicer for identifying a load instruction in an instruction sequence as a first occurrence of a qualified load instruction which will miss in a last-level cache. A commit buffer stores information pertaining to the first occurrence of the qualified load instruction and shadow instructions which follow. For a second occurrence of the qualified load instruction, an instruction slice is constructed from the information in the commit buffer to form a slice payload. A pre-execution engine pre-executes the instruction slice based on the slice payload to determine an address from which data is to be fetched for execution of a third and any subsequent occurrences of the qualified load instruction. The data is prefetched from the determined address for the third and any subsequent occurrence of the qualified load instruction.

27 Claims, 9 Drawing Sheets

(56) References Cited

U.S. PATENT DOCUMENTS

| | | | |
|---|---|---|---|
| 7,814,469 B2 | 10/2010 | Wang et al. | |
| 8,095,920 B2 | 1/2012 | Liao et al. | |
| 8,166,282 B2* | 4/2012 | Madriles | G06F 9/3012 |
| | | | 712/205 |
| 9,430,240 B1* | 8/2016 | Atta | G06F 9/3851 |
| 2002/0199179 A1* | 12/2002 | Lavery | G06F 8/456 |
| | | | 717/158 |
| 2003/0145314 A1 | 7/2003 | Nguyen et al. | |
| 2004/0054990 A1* | 3/2004 | Liao | G06F 8/4442 |
| | | | 717/124 |
| 2004/0154010 A1* | 8/2004 | Marcuello | G06F 9/3009 |
| | | | 717/158 |
| 2007/0101066 A1* | 5/2007 | Al Sukhni | G06F 12/0862 |
| | | | 711/137 |
| 2007/0101100 A1 | 5/2007 | Al Sukhni et al. | |
| 2007/0118696 A1 | 5/2007 | McCauley et al. | |
| 2007/0174555 A1 | 7/2007 | Burtscher et al. | |
| 2016/0371067 A1* | 12/2016 | Absar | G06F 8/456 |

OTHER PUBLICATIONS

Quinines, C.G. etal., Mitosis Compiler: An Infrastructure for Speculative Threading Based on Pre-Computation Slices, ACM, PLDI' 05, pp. 269-279. (Year: 2005).*

Collins J.D., et al., "Dynamic Speculative Precomputation", Proceedings of the 34th annual ACM/IEEE International Symposium on Microarchitecture, 2001, pp. 306-317.

International Search Report and Written Opinion—PCT/US2018/046889—ISA/EPO—dated Nov. 20, 2018.

* cited by examiner

100

```
ptr = head();
while (ptr) {
  data = ptr->data; // Load 2: load x4, [x5, #24]
  ptr = ptr->next;  // Load 1: load x5, [x5]
}
```

Data-dependent load

FIG. 1

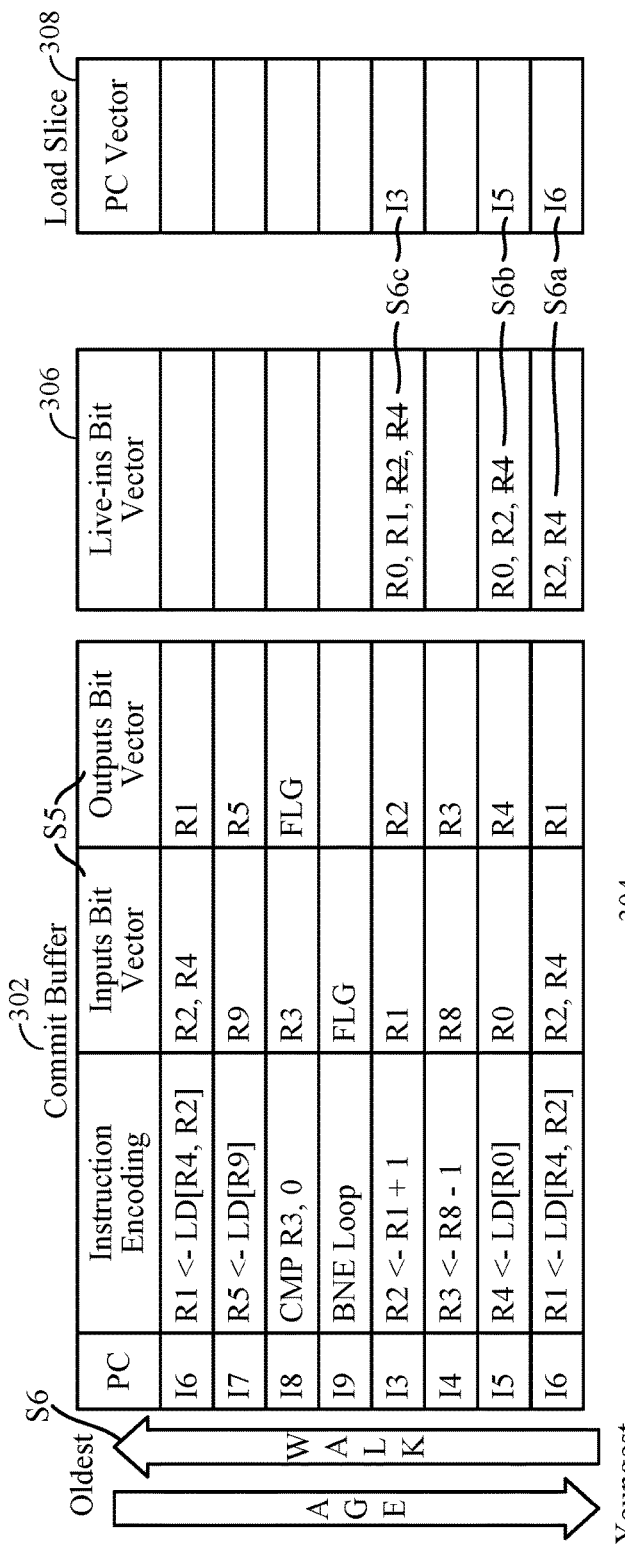
FIG. 4B
FIG. 4C

SLICE CONSTRUCTION FOR PRE-EXECUTING DATA DEPENDENT LOADS

FIELD OF DISCLOSURE

Disclosed aspects are directed to improving processing speeds of processing systems. More specifically, exemplary aspects are directed to slice construction for pre-executing data-dependent load instructions and prefetching data consumed by the data-dependent load instructions.

BACKGROUND

Some applications executable by a processor, such as graph analytics, search operations, etc., may involve utilization of large data sets. Related instruction code for these applications may include instructions in the form of data-dependent load instructions. A data-dependent load instruction, as known in the art, is used to load data from an address which is dependent upon data loaded by a prior load instruction (keeping in mind that the prior load instruction need not necessarily be a different load instruction but may be a prior execution of the same data-dependent load instruction).

A data-dependent load instruction presents challenges which other forms of load instructions may not. For instance, for load instructions which load from addresses which are not dependent upon prior loads, the addresses may follow patterns among the load instructions in a code sequence, which enables for predictive prefetching from the addresses based on determining strides among the patterns. However, for data-dependent load instructions, such pattern-based or stride-based prediction is not possible because the address from which to load data is itself dependent upon a different instruction.

FIG. 1 illustrates examples of data-dependent load instructions in instruction sequence 100 (which will be recognized by one skilled in the art to represent a pointer-chasing code). In instruction sequence 100, two types of data-dependent load instructions are illustrated. Firstly, Load 2 is a load instruction for loading data from an address determined by register x5, wherein the content of register x5 is determined by a different load instruction, Load 1. In this instance, Load 1 is alternatively referred to as a parent or producer load instruction of the data-dependent load instruction Load 2. The sequence of the parent and data-dependent load instructions, Load 1 and Load 2 in instruction sequence 100 is referred to as an instruction slice, wherein executing the instruction slice is dependent upon the content of the register x5 being made available. Secondly, Load 1 is also a data-dependent load instruction. In this case, considering two successive iterations of the loop defined by the "while (ptr)" in instruction sequence 100, the data contained at an address pointed to by register x5 is loaded into register x5 in the execution of Load 1 in a first iteration of the loop; and in a successive, second iteration of the loop, the value of register x5 from the first iteration is loaded in the execution of Load 1, which makes Load 1 of the first iteration a parent load instruction and Load 1 of the second iteration a corresponding data-dependent load instruction.

In the above-noted example applications such as graph analytics and search operation workloads, wherein the above instruction slice may be executed by a processor having a one or more caches in a memory hierarchy, it is seen that there is a high incidence of both loads (parent and dependent) in an instruction slice encountering a miss in one or more caches. A cache miss in a last-level cache (or "LLC") of the memory hierarchy may incur high penalties. To explain, the last-level cache such as a level-3 (L3) cache may be integrated on the same chip as the processor and used to service misses, when possible, from higher level caches such as level-2 (L2) cache, level-1 (L1) cache, etc., which are in closer proximity to the processor. But a miss in the last-level cache may incur large penalties in latency, e.g., in the order of hundreds of cycles, because the miss be forwarded to an external memory system or an off-chip memory such as a dynamic random access memory (DRAM), for example, to be serviced. Therefore, in the event of a last-level cache miss for the parent load instruction (e.g., for fetching the data at an address pointed to by register x5), any data-dependent load instructions (e.g., Load 2), as well as any dependents thereof may be stalled until the parent load instruction is serviced by accessing the DRAM. While waiting for the parent load instruction to be serviced, processing the dependent instructions is stalled, and the processor's execution pipeline may get backed up with further instructions which may be dependent on the parent load or dependent instructions thereof, which can lead to degradation in performance of the processor.

Accordingly, there is a need in the art for improving performance while avoiding the aforementioned drawbacks of conventional techniques in the processing of data-dependent load instructions.

SUMMARY

Exemplary aspects of the invention are directed to systems and methods for constructing an instruction slice for prefetching data of a data-dependent load instruction. A slicer is configured to identify a load instruction in an instruction sequence as a first occurrence of a qualified load instruction which will miss in a last-level cache. A commit buffer stores information pertaining to the first occurrence of the qualified load instruction and shadow instructions which follow. For a second occurrence of the qualified load instruction, an instruction slice is constructed from the information in the commit buffer to form a slice payload. A pre-execution engine pre-executes the instruction slice based on the slice payload to determine an address from which data is to be fetched for execution of a third and any subsequent occurrences of the qualified load instruction. The data is prefetched from the determined address for the third and any subsequent occurrence of the qualified load instruction.

For example, an exemplary aspect is directed to a method of instruction processing. The method comprises identifying a load instruction in an instruction sequence executable by a processor as a first occurrence of a qualified load instruction which will encounter a miss in a last-level cache of a cache hierarchy associated with the processor and storing information pertaining to the first occurrence of the qualified load instruction and shadow instructions which follow the qualified load instruction in a commit buffer. Upon detecting a second occurrence of the qualified load instruction in one of the shadow instructions, an instruction slice is constructed from the information in the commit buffer to form a slice payload, the instruction slice is pre-executed based on the slice payload to determine an address from which data is to be fetched for executing a third occurrence of the qualified load instruction, and the data is prefetched from the address for the third occurrence of the qualified load instruction.

Another exemplary aspect is directed to apparatus comprising a processor configured to execute an instruction sequence and a slicer of the processor configured to identify a load instruction in the instruction sequence as a first occurrence of a qualified load instruction which will encounter a miss in a last-level cache of a cache hierarchy associated with the processor. A commit buffer is configured to store information pertaining to the first occurrence of the qualified load instruction and shadow instructions which follow the qualified load instruction, wherein the slicer is configured to, upon detection of a second occurrence of the qualified load instruction in one of the shadow instructions, construct an instruction slice from the information in the commit buffer to form a slice payload, and a pre-execution engine is configured to pre-execute the instruction slice based on the slice payload to determine an address from which data is to be fetched for execution of a third occurrence of the qualified load instruction. A memory controller is configured to prefetch the data from the address for the third occurrence of the qualified load instruction.

Another exemplary aspect is directed to a non-transitory computer-readable medium comprising code, which, when executed by a computer, causes the computer to perform operations for instruction processing. The non-transitory computer-readable medium comprises code for identifying a load instruction in an instruction sequence executable by a processor as a first occurrence of a qualified load instruction which will encounter a miss in a last-level cache of a cache hierarchy associated with the processor; code for storing information pertaining to the first occurrence of the qualified load instruction and shadow instructions which follow the qualified load instruction in a commit buffer; code for, upon detecting a second occurrence of the qualified load instruction in one of the shadow instructions, constructing an instruction slice from the information in the commit buffer to form a slice payload; code for pre-executing the instruction slice based on the slice payload to determine an address from which data is to be fetched for executing a third occurrence of the qualified load instruction; and code for prefetching the data from the address for the third occurrence of the qualified load instruction.

Yet another exemplary aspect is directed to an apparatus comprising means for identifying a load instruction in an instruction sequence executable by a processor as a first occurrence of a qualified load instruction which will encounter a miss in a last-level cache of a cache hierarchy associated with the processor, means for storing information pertaining to the first occurrence of the qualified load instruction and shadow instructions which follow the qualified load instruction, means for, upon detecting a second occurrence of the qualified load instruction in one of the shadow instructions, constructing an instruction slice from the information in the means for storing to form a slice payload, means for pre-executing the instruction slice based on the slice payload to determine an address from which data is to be fetched for executing a third occurrence of the qualified load instruction, and means for prefetching the data from the address for the third occurrence of the qualified load instruction.

BRIEF DESCRIPTION OF THE DRAWINGS

The accompanying drawings are presented to aid in the description of aspects of the invention and are provided solely for illustration of the aspects and not limitation thereof.

FIG. 1 illustrates an example instruction sequence for a data-dependent load instruction.

FIGS. 4A-F illustrate slice construction, according to aspects of this disclosure.

DETAILED DESCRIPTION

Figure 2:
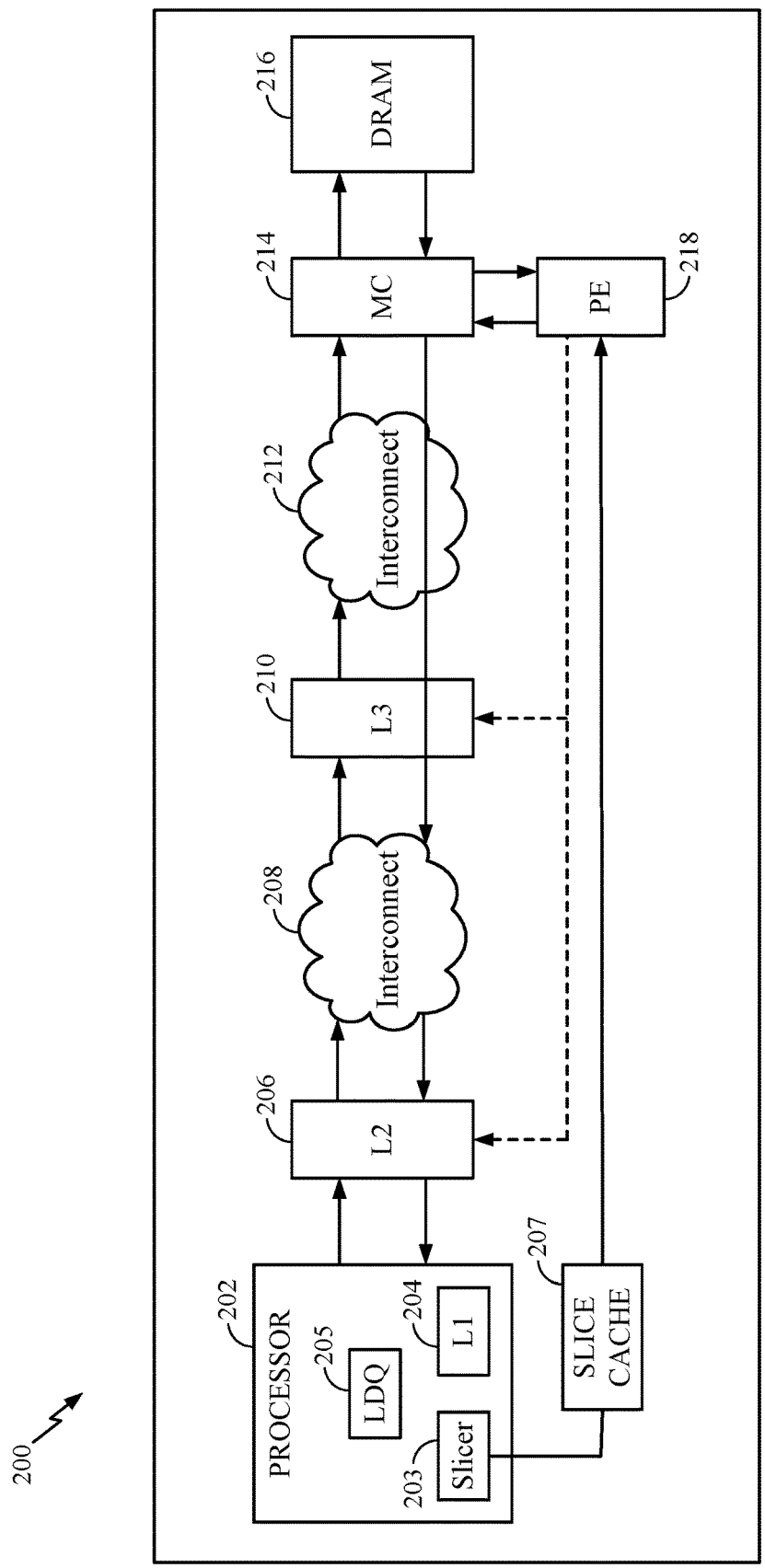
FIG. 2 illustrates a processing system, according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of this disclosure are directed to improving performance related to processing data-dependent load instructions. More specifically, exemplary aspects are directed to minimizing the impact of last-level cache misses for data upon which the data-dependent load instructions are dependent. Accordingly, aspects of this disclosure are directed to detecting data-dependent load instructions and constructing an instruction slice whose execution would provide an address for the data upon which the data-dependent load instructions are dependent.

The instruction slice is constructed by an exemplary mechanism referred to as a slicer in this disclosure (which may be a component of a processor and implemented by suitable combinations of hardware and software). The slice construction creates a slice payload which comprises information regarding the instruction slice. The slice payload for a data-dependent load instruction is stored in a slice cache, with the slice payload associated with (e.g., tagged based on) the corresponding data-dependent load instruction in the slice cache.

For future occurrences of the data-dependent load instruction, upon determination (e.g., as early as the dispatch stage of the data-dependent load instruction) that there exists a slice payload in the slice cache, the slice payload is forwarded to a pre-execution engine which is provided in proximity to the last-level cache or a memory controller. The pre-execution engine is configured to execute the instruction slice using based on the slice payload, e.g., in a loop, in advance of the execution of the data-dependent load instruction and its corresponding instruction slice being completed in the processor. This process of executing the instruction slice in the pre-execution engine is referred to as pre-execution of the instruction slice. The pre-execution provides the address from which the data for the data-dependent load is to be fetched from, and based on this, the memory controller is directed to fetch (or prefetch) the data from a backing memory or DRAM (which may be an off-chip component, as noted above).

The data is prefetched from the DRAM into a buffer, which may be located in the memory controller. When the data-dependent load is next encountered by the processor in the course of instruction processing (e.g., a next iteration of the instruction slice), the related data would already have been fetched into the memory controller (which may be located on-chip, i.e., integrated on the same chip as the processor and the last-level cache). Therefore, even if the data missed in the last-level cache, the data may be obtained from the memory controller without incurring the penalty associated with servicing the data from the off-chip DRAM, for example.

With reference now to FIG. 2, an exemplary processing system 200 in which aspects of this disclosure may be employed, is shown. Processing system 200 is shown with processor 202, with slicer 203 and a level-1 (L1) cache 204 shown within the block designated as processor 202 (although, it will be understood that other configurations for these blocks shown as slicer 203 and L1 cache 204 are possible without departing from the scope of this disclosure). In exemplary implementations, processor 202 may also include load queue (LDQ) 205 configured to track outstanding load instructions. Processor 202, and more specifically, slicer 203 may be coupled to slice cache 207, which is in turn coupled to pre-execution engine 218.

Processor 202 may also be communicatively coupled to one or more memory structures such as L2 cache 206, L3 cache 210, etc. In the illustrated case, L3 cache 210 may be a last-level cache and may be on-chip or embedded on the same chip as processor 202. A memory controller such as memory controller 214 may be configured to control a memory interface to DRAM 216, which may be an off-chip memory. However, it will be understood that the references to on-chip (or internal) and off-chip (or external) integrations of the various above-described components is merely exemplary to illustrate potential performance benefits of aspects of this disclosure, but not meant as a limitation; as such, the exemplary aspects are equally applicable to any other suitable integration of the above-described components.

Interconnect 208 between L2 cache 206 and interconnect 212 between L3 cache 210 and memory controller 214 are also particularly identified in FIG. 2. In exemplary aspects of this disclosure, the pre-execution of identified instruction slices can entail prefetching data into a buffer (not shown) in memory controller 214. In such cases, the latency involved in a potential miss in the last-level cache such as L3 cache 210 for obtaining the data would relate to the combined latencies associated with interconnects 208 and 212. On the other hand, if the data was not prefetched according to this disclosure, the additional latency of accessing DRAM 216 would be incurred if there is a last-level cache miss.

Slicer 203 is a functional block configured to identify instruction slices for pre-execution, and identify live-ins, which are registers not locally produced but are consumed by instructions in the instruction slices. The live-ins, identifiers such as operation codes (op codes) of instructions identified in the slice, their program order, and any other information pertaining to the instruction slice is referred to as the slice payload. Slice cache 207 comprises mechanisms for caching or storing the slice payload for load instructions identified or predicted to be a data-dependent load instruction which would miss in the last-level cache, as will be explained in greater detail below. The slice payload is provided to pre-execution engine 218 to pre-execute the next occurrence of the instruction slice (e.g., in a subsequent iteration of a loop) to enable prefetching of the data upon which the data-dependent load instruction is dependent. In one aspect, pre-execution engine 218 is correspondingly configured with an execution engine for pre-executing the instruction slice. Pre-execution engine 218 may direct memory controller 216 to prefetch the data, which may be stored within a buffer in memory controller 216 as previously mentioned, or alternatively, pre-execution engine 218 may also be provided with such a buffer for storing the prefetched data without significant deviation from the description of exemplary aspects herein.

Figure 3:
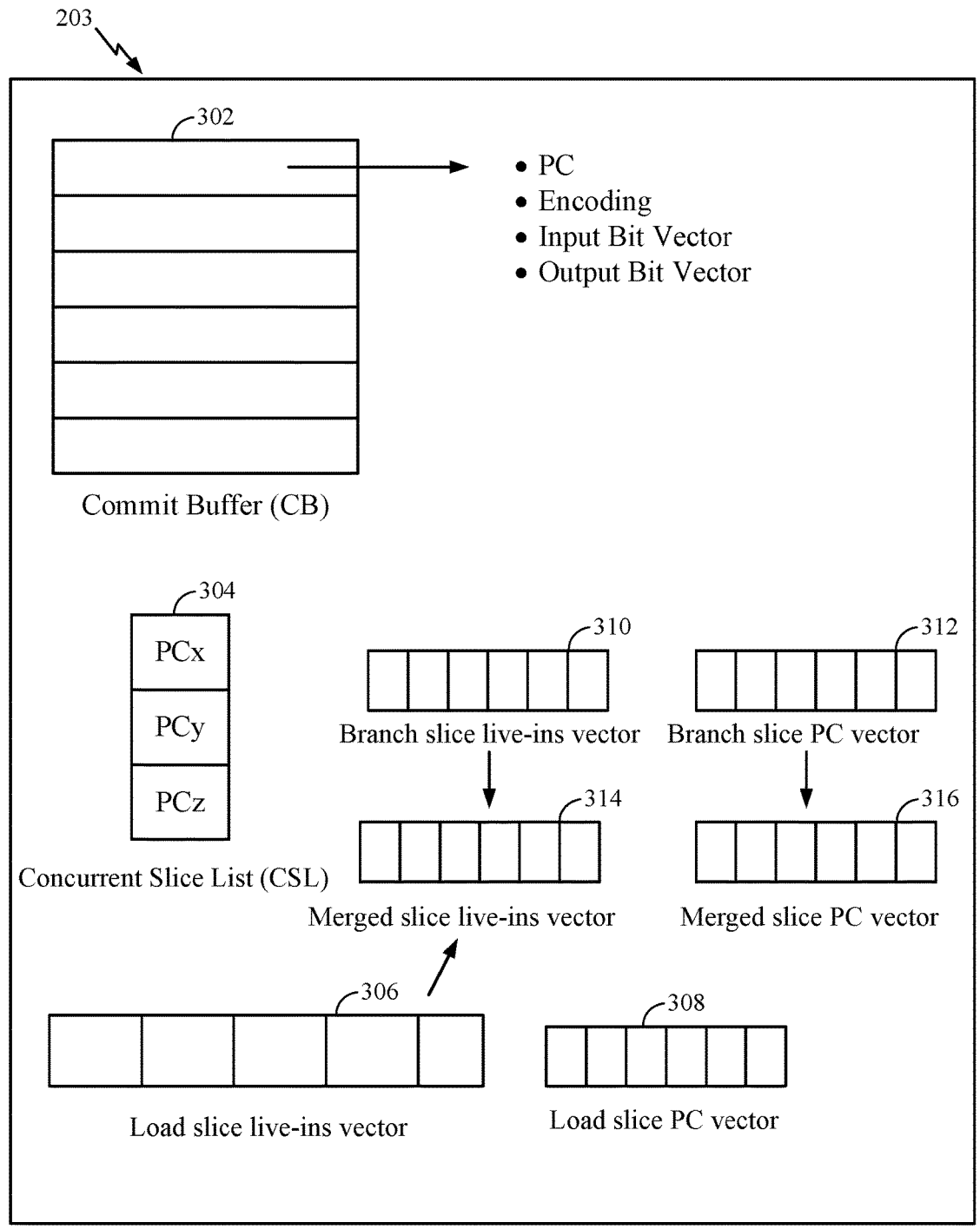
FIG. 3 illustrates a slicer, according to aspects of this disclosure.

Referring now to FIG. 3, a further detailed view of some of the component blocks of slicer 203 are shown therein. Slicer 203 is generally configured to identify an instruction slice for pre-execution along with live-ins for the instruction slice. The following functional blocks may be provided in slicer 203 for implementing the above functionality.

Referring first to commit buffer (or "CB") 302, this is a functional block configured to store identities and details of instructions executed, e.g., by processor 202 (of FIG. 2), in program order as the instructions commit. In this regard, commit buffer 302 is configured to store information or metadata pertaining to the instructions, the information comprising the PCs of the instructions, instruction encoding or command, input registers, output registers, etc. Commit buffer 302 is configured such that instructions and related metadata are placed into commit buffer 302 and automatically drain out from commit buffer 302 in a first-in-first-out (FIFO) manner.

In exemplary aspects, insertion of instructions and related metadata into commit buffer 302 is first enabled before the instructions and related metadata can be placed into commit buffer 302. Exemplary logic for enabling insertion in commit buffer 302 will now be described. In an aspect, commit buffer 302 may be enabled for insertion if the oldest load instruction in load queue 205 is determined to be a load instruction which would have encountered a miss in the last-level cache, L3 cache 210, with the assumption that a miss in the last-level cache is indicative of the load instruction being a data-dependent load instruction (because, as previously mentioned, data for other types of load instructions is more amenable for prefetching, e.g., based on pattern or stride detection, and so the other types of load instructions may be assumed to not encounter a last-level cache miss in modern day high performance processors). Determining that the oldest load instruction would have missed in the last-level cache may be based on determining the number of clock cycles that a load instruction allocated in load queue 205 is waiting for data to be returned.

A counter provided in processor 202, for example (not shown explicitly), for each load instruction in load queue 205, to count the number of clock cycles that load instruction remains in load queue 205. When each load instruction is dispatched for execution, the load instruction is allocated an entry in load queue 205, where it waits until the data it is dependent upon is obtained. In this regard, if there is a hit in L1 cache 204 for the data, then the data would be returned relatively very rapidly, e.g., in 1-2 cycles, which would mean that the count value would indicate 1-2 cycles. If the load instruction misses in L1 cache 204 but hits in L2 cache 206, then the data will be returned after a number of cycles for which the value of the counter would match the latency of a hit in L2 cache 206. Similarly, if there is a miss in L2 cache 206 but a hit in L3 cache 208, then the count value would match the latency of a hit in L3 cache 208. If, however, the count value is greater than the latency of a hit in L3 cache 208 (or a "last-level cache hit latency"), then the load instruction is considered to be a miss in L3 cache 208 or a last-level cache miss. The last-level cache hit latency may be known in advance for processing system 200 and will be referred to as a predetermined or pre-specified number (e.g., 40 clock cycles).

If the count of the number of consecutive clock cycles that a load instruction is waiting in load queue 205 for its load data is greater than a predetermined number which represents the last-level cache hit latency or hit latency for L3 cache 210 then the load instruction is considered to be a "qualified load instruction" whose load data would result in a last-level cache miss in L3 cache 210. Once such a qualified load instruction is identified, commit buffer 302 is enabled for insertion in an exemplary aspect (otherwise, commit buffer 302 remains disabled); and subsequently, insertion of the qualified load instruction and shadow instructions which follow the qualified load instruction, and respective related metadata thereof, in commit buffer 302 is started.

With continued reference to FIG. 3, concurrent slice list 304 is configured to store the program counter values (PCs) of qualified load instructions for which slice construction has been enabled in commit buffer 302. Thus, concurrent slice list 304 provides a mechanism for checking which qualified load instruction has an ongoing slice construction. In an aspect, an entry in concurrent slice list 304 is created the first time a qualified load instruction is encountered in an instruction sequence executed by processor 202. Thus, the next or second time the qualified load instruction is encountered in an instruction sequence executed by processor 202, consulting concurrent slice list 304 would reveal that a slice construction effort for the qualified load instruction is to be started, and a slice payload is created and stored in slice cache 207. In this manner, if the qualified load instruction is a data-dependent load instruction, then for the third and future occurrences of the data-dependent load instruction, the slice payload is forwarded to pre-execution engine 218, enabling an opportunity for prefetching the corresponding data based on the exemplary pre-execution of the instruction slice using the slice payload, without resulting in a last-level cache miss for the third and future occurrences of the qualified load instruction.

In some examples, concurrent slice list 304 may support storage of multiple PC values. The size of or number of PC entries stored in concurrent slice list 304 indicates the number of concurrent chains of instruction slices which may be supported. In the example shown, there are three PCs in concurrent slice list 304 identified as $PC_x$, $PC_y$, and $PC_z$, which indicates that up to three concurrent chains of slice construction may be supported for respective three qualified load instructions. Concurrent slice list 304 may also be structured as a FIFO list in the order of insertion of these PCs into concurrent slice list 304, such that the first PC in to concurrent slice list 304 is the first one out. In the following description, slice construction for a single qualified load instruction will be explained in greater detail for the sake of simplicity, while keeping in mind that similar explanations apply for other concurrent instruction slices. Furthermore, it is noted that in exemplary aspects, commit buffer 302 may be disabled (to disallow insertion of instructions) when concurrent slice list 304 is empty, since this means that there are no qualified load instructions for which there are slices presently being constructed, and so commit buffer 302 and related logic may be disabled to conserve power.

With regard to insertion of PCs into concurrent slice list 304, at the time the qualified load instructions are inserted in commit buffer 302, their PCs are searched for in concurrent slice list 304. If a PC of a qualified load instruction inserted into commit buffer 302 is not present in concurrent slice list 304, then that PC is added into concurrent slice list 304. If concurrent slice list 304 is full, then insertion of a new PC in concurrent slice list 304 may involve replacing the oldest PC in concurrent slice list 304, given the above-described FIFO organization of concurrent slice list 304. If, the PC of the qualified load instruction inserted into commit buffer 302 is found to already be present in concurrent slice list 304, i.e., for the second occurrence of the qualified load instruction whose PC was stored in concurrent slice list 304 at the first occurrence of the qualified load instruction, then the process of instruction slice extraction is triggered or initiated.

With regard to removal of a PC from concurrent slice list 304, an entry of concurrent slice list 304 comprising a PC can be replaced by the PC of another qualified load instruction (e.g., if concurrent slice list 304 is full). Further, when a load instruction is drained out from commit buffer 302, concurrent slice list 304 is checked with the PC of the load instruction drained out from commit buffer 302 and if the PC of the load instruction drained out from commit buffer 302 is present in concurrent slice list 304, then the corresponding entry comprising the PC of the instruction drained out from commit buffer 302 is removed from concurrent slice list 304. In another aspect, if, say, a first PC of a first load instruction and a second PC of a second load instruction are stored in concurrent slice list 304 and it is discovered that the second load instruction is part of a chain of a first load instruction, then the second PC of the second load instruction is removed from concurrent slice list 304.

If commit buffer 302 is enabled for insertion as discussed above (i.e., at least one qualified load instruction has been identified in load queue 205), instructions from load queue 205 starting with the first occurrence of the qualified load instruction and proceeding with shadow instructions which follow this qualified load instruction are inserted into commit buffer 302 as the instructions commit.

At the time of insertion in commit buffer 302, the respective PCs of any load instructions which are shadow instructions of the qualified load instruction are searched in concurrent slice list 304 to determine if there is a second occurrence of the qualified load instruction. If the PC of a presently committing load instruction matches the PC of the first occurrence of the qualified load instruction which is already present in concurrent slice list 304, this indicates that the PC of the committing load instruction is being inserted into concurrent slice list 304 after at least one previous insertion, which reveals that the presently committing load instruction is the second occurrence of the qualified load instruction. Subsequently, upon detection of the second occurrence of the qualified load instruction, a process of instruction slice extraction is commenced based on information stored in commit buffer 302.

In exemplary aspects, slicer 203 is configured to analyze instructions serially from the most recent to the oldest instruction in order to construct the instruction slice or instruction sequence. Thus, the instruction slice comprises the second occurrence of the qualified load instruction, shadow instructions of the first occurrence of the qualified load instruction (also referred to as "the originally qualified load instruction") and the first occurrence of the load instruction. Within the instruction slice, input registers of some instructions may be produced locally, i.e., by instructions within the slice, while input registers of some instructions may not be locally produced. These registers which are not locally produced within the instruction slice and are consumed by instructions in the instruction slice are referred to as "live-ins"; and the set of live-in registers for an instruction slice is generally referred to as a live-ins set. The set of live-ins for the instruction slice are to be obtained in order to pre-execute the instruction slice in pre-execution engine 218, and accordingly, the set of live-ins forms at least a part of the slice payload.

Various mechanisms for tracking different types of live-ins will now be described. In general, the live-ins may be tracked using vectors (e.g., bit-vectors) of lengths which may correspond, for example, to the total number of logical registers provided in an instruction set architecture of processor 202, for example.

Slicer 203 may include one or more live-ins vectors to capture registers which are consumed by instructions in an instruction slice, along with PC vectors to capture instructions along with their program order in the instruction slice. The live-ins vectors and the PC vectors form the slice payload and are stored in slice cache 207 to be provided to pre-execution engine 218, e.g., at the third occurrence (and subsequent/future occurrences) of the qualified load instruction. Pre-execution engine 218 is thus enabled to pre-execute the instructions in the instruction slice using the slice payload, in order to prefetch the data of data-dependent load instructions from DRAM 216, for example, without waiting for the data for the third and future occurrences of the qualified to be serviced from DRAM 216 following a potential miss in L3 cache 210.

Among the live-ins vectors, exemplary aspects include separate live-ins vectors and PC vectors for: instruction slice construction with instructions which do not include branch and compare instructions; and for instruction slice construction with instructions which include branch and compare instructions. The two separate live-ins vectors are merged to create merged live-ins vectors and similarly, the two separate PC vectors are merged in PC order to create merged PC vectors. The corresponding instruction slice represented by the merged live-ins vectors and merged PC vectors is used by pre-execution engine 218 for pre-executing the instruction slice. Example live-ins vectors and PC vectors of slicer 203 will now be explained in further detail.

As shown in FIG. 3, slicer 203 includes load slice live-ins vector 306, which may be a bit vector configured to capture slice live-ins as an instruction slice is constructed. More specifically, load slice live-ins vector 306 may be used in creating an instruction slice for a qualified load instruction, and more specifically, an instruction slice around the qualified load instruction which excludes branch instructions and compare instructions.

In conjunction with load slice live-ins vector 306, load slice PC vector 308 is also provided in slicer 203, to store the PCs of instructions, which are not branch instructions or compare instructions, which are included in the instruction slice. Load slice PC vector 308 may be used for identifying instructions in the respective instruction slice for the qualifying load instruction if there are no branch instructions or compare instructions to be included in the exemplary pre-execution.

In the implementation of slicer 203 shown in FIG. 3, two more functional blocks, identified as branch slice live-ins vector 310 and branch slice PC vector 312, are also illustrated, which may be used if branch instructions are included in an example instruction slice.

In more detail, if branch instructions are included in an instruction slice, then branch slice live-ins vector 310 is separately created to be later merged with load slice live-ins vector 306. Branch slice live-ins vector 310 may also be configured as a bit vector used to capture live-ins in a branch slice construction.

Correspondingly, branch slice PC vector 312 is configured to store the PCs of instructions selected to be part of a branch slice if branch instructions are to be included in the instruction slices under consideration.

Accordingly, in such cases wherein branch instructions are included in an instruction slice, merged slice live-ins vector 314 is provided, wherein load slice live-ins vector 306 may be merged with branch slice live-ins vector 310 in merged slice live-ins vector 314. Correspondingly, merged slice PC vector 316 is also provided, wherein load slice PC vector 308 may be merged with branch slice PC vector 312 in program order or PC order in merged slice PC vector 316. Merged slice PC vector 316 formed by merging load slice PC vector 308 with branch slice PC vector 312 in this manner may be used in creating the instruction slice.

The cooperation of the above-described functional blocks of slicer 203 in the construction of instruction slices for forming the slice payload to be stored in slice cache 207 and used in pre-execution by pre-execution engine 218 will now be described with reference to example code sequences and related instruction slice construction, shown in FIGS. 4A-F.

Figure 4A:
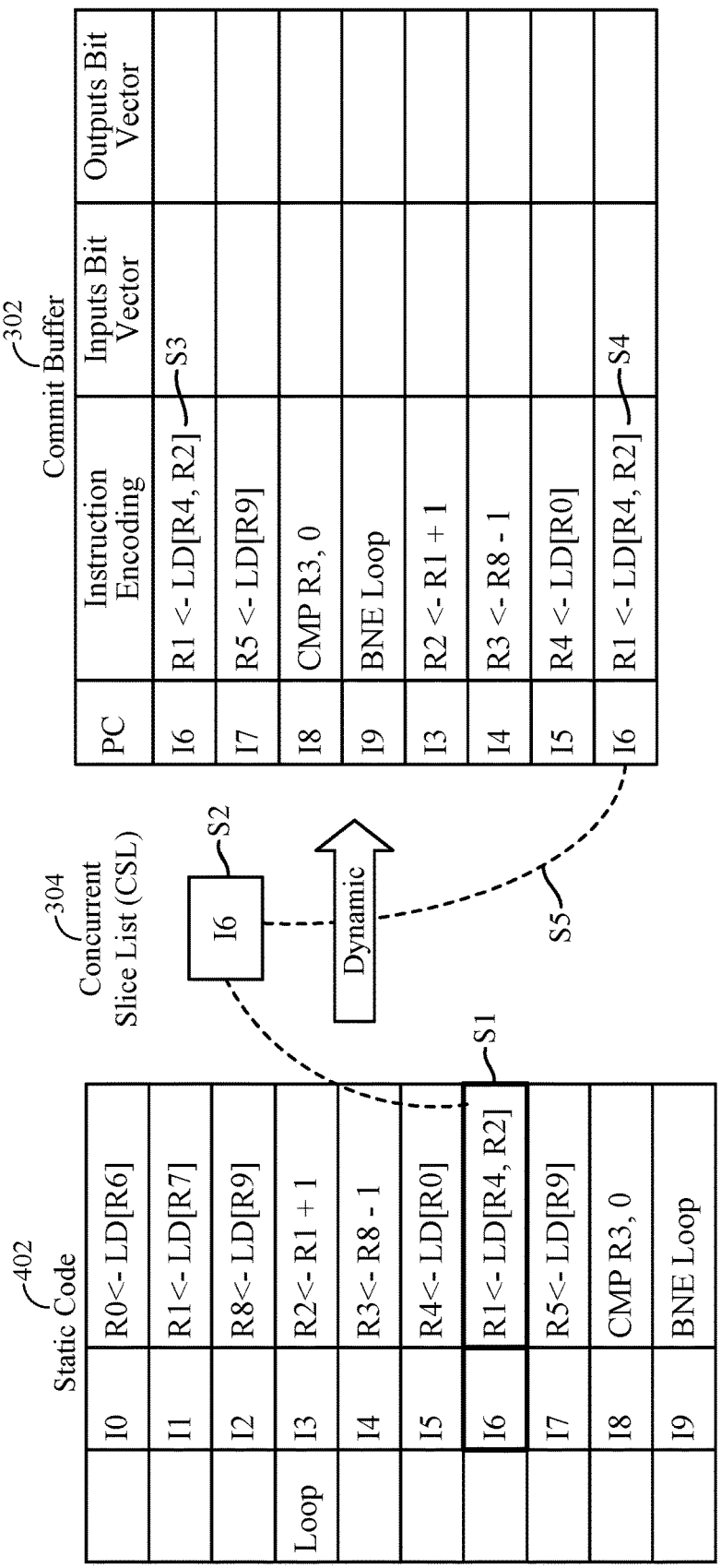

Referring first to FIG. 4A, static code 402 shows an example instruction sequence which may be executed by processor 202 and will be used purely for the purpose of explanation of exemplary aspects, without any inherent limitation to be inferred from the specific instructions or sequences of instructions discussed herein. As such, static code shows ten instructions labeled I0-I9, along with respective operations/commands, and the producer and consumer registers (if any) for each one of instructions I0-I9. Among these, instructions I3-I9 are shown to be part of a loop, with these instructions I3-I9 being repeatedly executed until the exit condition for the loop in instruction I9 is encountered (in the example shown, if the condition branch not equal (BNE) in instruction I9 is satisfied, execution goes back to the loop starting with instruction I3; but if the condition is not satisfied, then the loop is exited). The following exemplary steps will be used to describe a process flow related to identifying and constructing an instruction slice for static code 402. Since the instructions I3-I9 are part of a loop, their execution is likely to be repeated. In exemplary aspects, information gained from a first and second iteration of the loop is used in an exemplary process to pre-execute third and subsequent iterations of the loop and in turn prefetch data for data-dependent load instructions in the loop. In the loop, instruction I6 is a data-dependent load instruction, which may be detected as a qualified load instruction during its first occurrence or during a first iteration of the loop, based, for example, on the number of clock cycles that instruction I6 is present in load queue 205, while waiting for its data. If this number is greater than the predetermined number representing the hit latency of L3 cache 210, then instruction I6 is determined to be a qualified load instruction whose load data would result in a last-level cache miss in L3 cache 210.

As shown, instruction I6 may be detected as a qualified load instruction at the first iteration of the loop in step S1.

At step S2, upon identifying load instruction I6 as a qualified load instruction, the PC of load instruction I6 is inserted in concurrent slice list 304 (it is assumed that concurrent slice list 304 does not already contain the PC of load instruction I6 in this example).

At step S3, commit buffer 302 is enabled to start capturing instructions including load instruction I6 and shadow instructions which follow load instruction I6.

Since instructions I3-I9 of static code 402 are part of a loop, there is a second occurrence of load instruction I6 during a subsequent, second iteration of the loop. Step S4 indicates this second occurrence of load instruction I6 being inserted in commit buffer 302.

At step S5, it is observed that the second occurrence of load instruction I6 in commit buffer 302 will have an entry with a matching PC (or a tag thereof) in concurrent slice list 304. By pre-executing an instruction slice which would lead to the address from which data for third and subsequent occurrences of instruction I6 being obtained, the data may be prefetched. Thus, the match in concurrent slice list 304 for the second occurrence of instruction I6 triggers or initiates instruction slice construction (for both load slices as well as branch slices) for use in prefetching the data for third and any subsequent iterations of the loop (and correspondingly, third and subsequent occurrences of instruction I6), in the following exemplary manner.

Referring now to FIGS. 4B-C, aspects pertaining to load slice construction will be described. In FIG. 4B, at a step generally identified as step S5, the respective inputs bit vector comprising registers consumed and outputs bit vector comprising registers produced for each of the instructions captured in commit buffer 302 have been illustrated.

The first occurrence or first instance of load instruction I6 during the first iteration of the loop (e.g., at step S3) in commit buffer 302 is the oldest instruction; and the second instance of load instruction I6 during the second iteration of the loop (e.g., at step S4) is the youngest instruction captured in commit buffer 302. At step S6, instructions captured in commit buffer 302 are walked backwards, step by step, with identifying the live-ins at each step, starting from the youngest instruction, which is the second instance of instruction I6.

At each step, the live-ins are identified and noted in load slice live-ins vector 306, with corresponding PCs stored in load slice PC vector 308. Once the instruction slice has been fully constructed, i.e., the process of walking backwards from the youngest to the oldest instruction in commit buffer 302 is completed, the version of live-ins bit vector 306 upon completion provides the true live-ins vector, i.e., the set of registers which are not locally produced within the instruction slice. At each step, if an instruction produces a register in load slice live-ins vector 306, then that instruction is added to the instruction slice. If there are matching live-ins then they are replaced with new instruction live-ins.

For example, at step S6a, starting with the youngest instruction, load instruction I6, the registers consumed by load instruction I6 are assumed to be live-ins at this step and so registers R2 and R4 are noted as live-ins in load slice live-ins vector 306 with corresponding PC inserted as I6 in load slice PC vector 308.

At step S6b, continuing to walk backwards, instruction I5, which loads from (consumes) register R0 into (produces) register R4 is encountered. Register R0 consumed by instruction I5 is added to load slice live-ins vector 306. But since register R4 is produced by instruction I5, register R4 is locally produced by the instruction slice and so is not a true live-in. Therefore, a reference to register R4 is deleted from load slice live-ins vector 306. Correspondingly, the PC for instruction I5 is inserted as I5 in load slice PC vector 308. To explain further, by pre-executing instruction I5, which is part of the instruction slice, the register R4 would be produced, which means that the data of register R4 does not need to be tracked as one of the live-ins registers anymore.

It is noted that instruction I4 (which produces register R3) does not produce a register in the current live-ins vector comprising registers R0 and R2 at step S6b, so instruction I4 is not added to the instruction slice.

At step S6c, instruction I3 which produces register R2 is added to the instruction slice, and in more detail, register R1 consumed by instruction I3 is added to load slice live-ins vector 306 and register R2 produced by instruction I3 is deleted from load slice live-ins vector 306 (similar to deletion of register R4 explained above). Correspondingly, the PC for instruction I3 is inserted as I3 in load slice PC vector 308.

None of the remaining instructions I9, I8, and I7 (before reaching the first instance of the qualified load instruction I6) produces a register in the current live-ins vector comprising registers R0 and R1 at step S6c and/or these instructions include branch instructions (e.g., instruction I9 directed to a branch-not-equal (BNE) instruction) and/or compare instructions (e.g., instruction I8 directed to a compare (CMP) instruction), so these instructions are not instructions which are added to load slice under construction and as such the instruction slice construction is now complete for the load slice.

Referring now to FIG. 4C, the result of steps S1-S6 (with step S6 comprising sub-steps S6a-c as discussed above) is shown as constructed load slice 404 for static code 402 based on qualified load instruction I6. Constructed load slice 404 includes registers R0 and R1 remaining in load slice live-ins vector 306 and PCs for instructions I6, I5, and I3 in load slice PC vector 308.

Figure 4D:
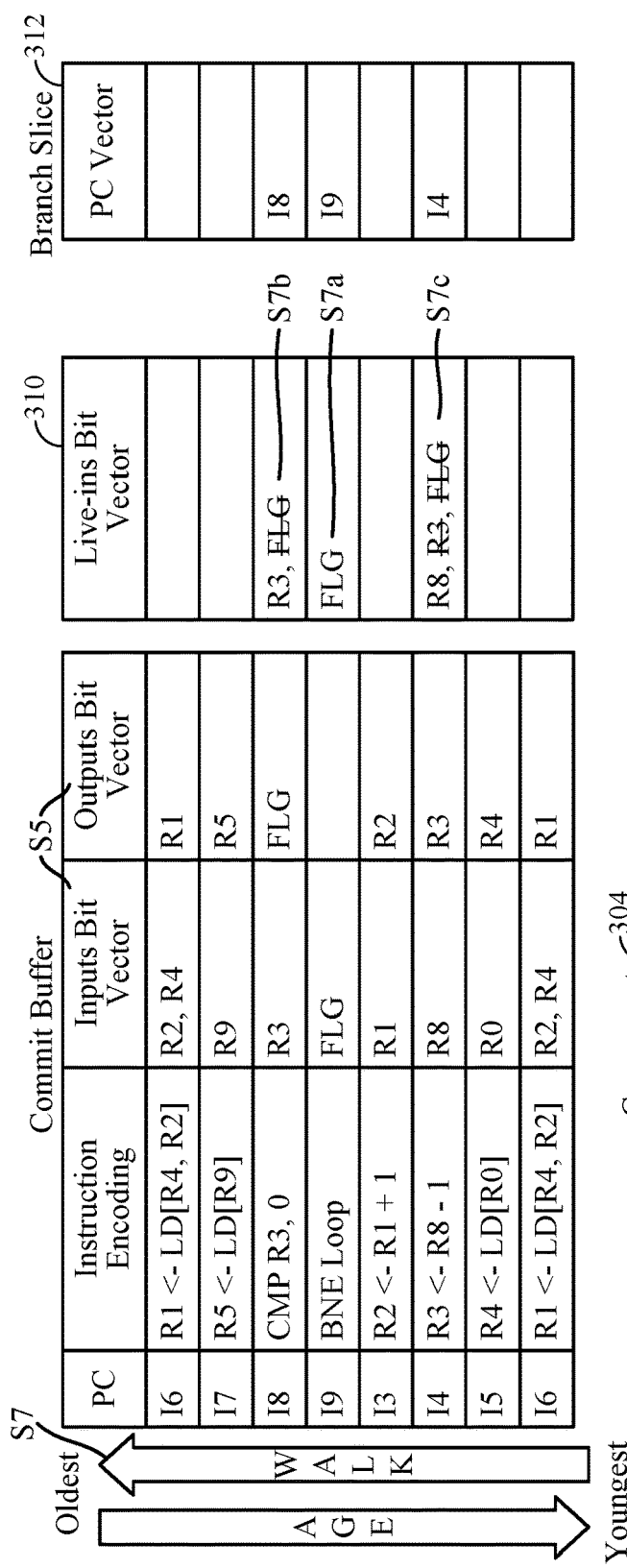
Figure 4E:
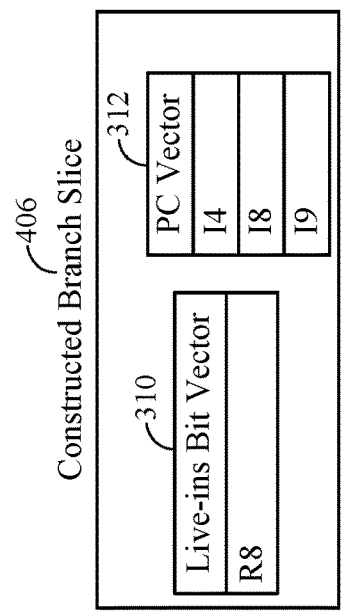

With reference now to FIGS. 4D-E, aspects related to branch slice construction will be described. FIG. 4D is similar in some aspects to FIG. 4B, and so an exhaustive repetition of like concepts will be avoided for the sake of brevity. Like in FIG. 4B, FIG. 4D also starts with step S5, to populate the respective input and output bit vectors for each of the instructions captured in commit buffer 302.

Step S7 involves a similar process of walking backwards starting from the youngest instruction, which is the second instance of load instruction I6. In this case, the process of walking backwards is used to populate entries of branch slice live-ins vector 310 and branch slice PC vector 312. The result of the walking backwards in step S7 is the constructed branch slice 406 shown in FIG. 4E. Once again, if an instruction produces a register in branch slice live-ins vector 310, that instruction is added to the chain.

In the process of walking backwards in step S7, the first branch instruction encountered is instruction I9. Step S7a comprises adding the consumer registers (in this case, the register named "FLG") to branch slice live-ins vector 310 and corresponding PC of instruction I9 as I9 to branch slice PC vector 312.

Step S8 involves the next instruction encountered for a branch slice construction, which is instruction I8, which produces FLG and consumes register R3, so R3 is added to branch slice live-ins vector 310, while FLG is deleted; and corresponding PC of instruction I8 is added as I8 to branch slice PC vector 312.

The code in commit buffer 302 occurs as a loop, so the next time instruction I4 is encountered, at step S7c, it produces register R3 and consumes register R8, so register R8 is added to branch slice live-ins vector 310, while register R3 is deleted; and corresponding PC of instruction I4 is added as I4 to branch slice PC vector 312.

Referring now to FIG. 4E, constructed branch slice 406 as a result of steps S1-S5, followed by step S7 (comprising steps S7a-c as described above) is shown. Constructed branch slice comprises register R8 remaining in branch slice live-ins vector 310 and PCs of instructions I9, I8, and I4 stored in branch slice PC vector 312.

Figure 4F:
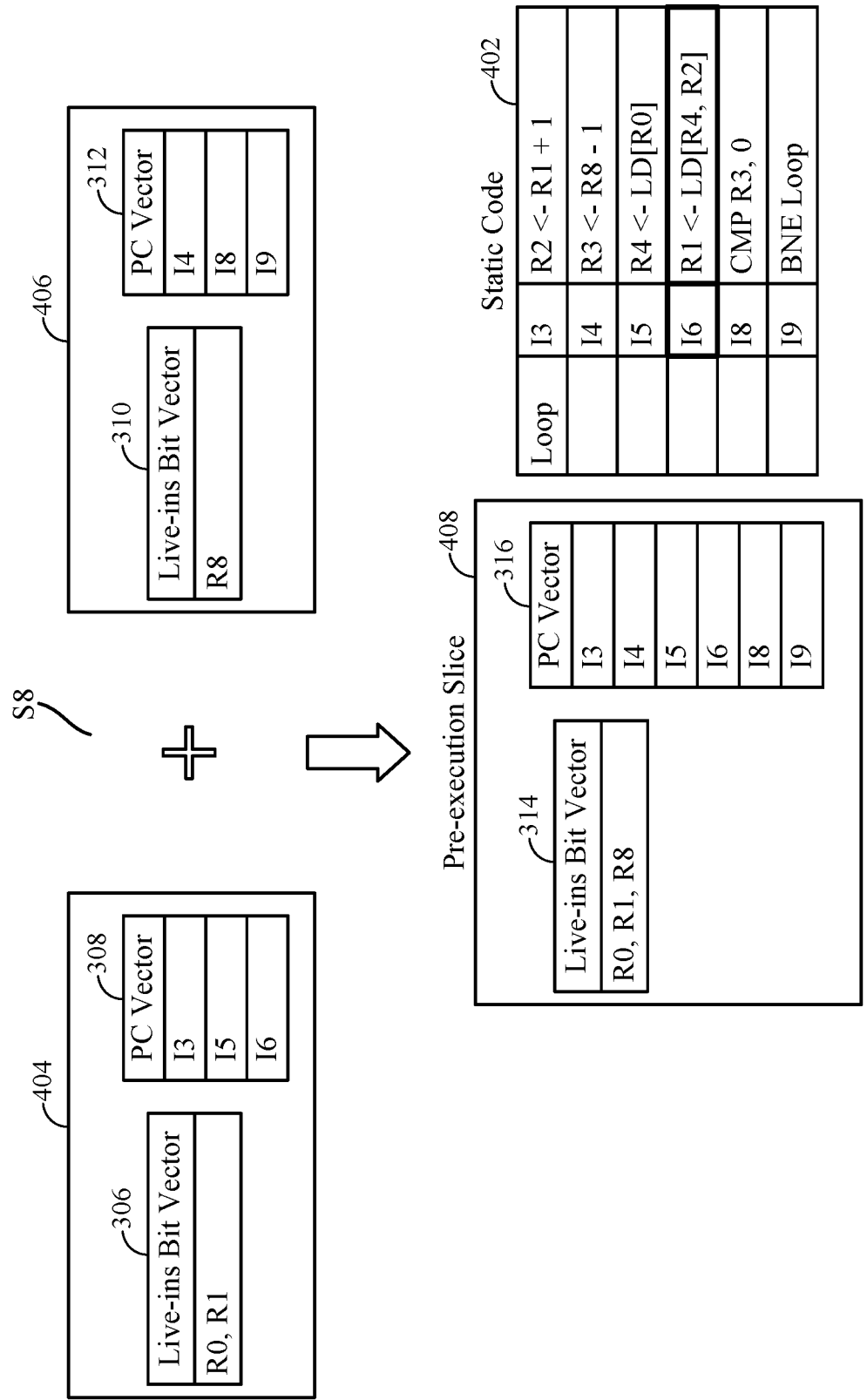

FIG. 4F illustrates merging constructed load slice 404 and constructed branch slice 406 in step S8 to create the instruction slice for pre-execution, designated as pre-execution slice 408. In more detail, pre-execution slice 408 includes merged slice live-ins vector 314 comprising registers R0, R1, R8, which is a result of merging registers R0, R1 of load slice live-ins vector 306 and register R8 of branch slice live-ins vector 310; and merged slice PC vector 316 comprising PCs I9, I8, I6, I5, I4, and I3 which is a result of merging PCs I6, I5, and I3 of load slice PC vector 308 in PC order with PCs I9, I8, and I4 of branch slice PC vector 312. Pre-execution slice 408 comprising merged slice live-ins vector 314, merged slice PC vector 316 (which also provides the program order of the instructions) forms the slice payload which is stored in slice cache 207. From slice cache 207, the slice payload may be provided to pre-execution engine 218 for pre-execution of the instruction slice when a third instance of instruction I6 is encountered. For example, as early as the dispatch stage, slice cache 207 may be consulted to see if there is an entry tagged with the PC of instruction I6, and if there is, the entry comprising the slice payload for instruction I6 is forwarded to pre-execution engine 218 for pre-execution.

In more detail, by the time instruction I6 is next encountered (e.g., a third and any subsequent iterations), the data stored in registers identified in merged slice live-ins vector 314 may already be captured, or in other words, the data or physical register values of registers R0, R1 and R8 may be stored in slice cache 207. It is also noteworthy that the register R1 is identified as a live-in for the first iteration of the loop, but from the second iteration onwards, it will be locally produced by instruction I6 (enabling prefetching of register R1). Thus, from the second iteration onwards, merged slice live-ins vector 314 will comprise indications of registers R0 and R8, but not R1.

In more detail, from the slice payload, pre-execution engine 218 is provided with the instruction sequence in the instruction slice (which provides the order in which the instructions are supposed to be executed) along with the encoding of the instructions in the instruction slice (such that pre-execution engine 218 is provided information on what type of instructions are to be executed). Since pre-execution engine 218 is also provided with the values the live-ins in the slice payload, the instruction slice can be pre-executed in pre-execution engine 218. Once the slice payload comprising aforementioned values of the live-ins registers and the details of the instruction slice are sent to pre-execution engine 218 from slice cache 207 and pre-execution engine 218 starts pre-executing the instruction slice, the content of R1 may be prefetched, i.e., the data for the data-dependent load instruction I6, starting from the third iteration of instruction I6, which is dependent on the second iteration of instruction I6 (with the first iteration of instruction I6 feeding instruction I3, which in turn feeds the second iteration of instruction I6) may be prefetched. In the above example for static code 402, the content or data of register R1 may be prefetched from DRAM 216 and placed in a buffer (not shown), wherein the buffer may be provided in memory controller 214 or in pre-execution engine 218.

Accordingly, the content of register R1 corresponding to the third iteration of instruction I6 is prefetched based on pre-executing the instruction slice for instruction I6 as described above. Accordingly, if the register R1 misses in L3 cache 210, for example, the data of register R1 will be available in memory controller 214, as it is prefetched into memory controller 214 or a buffer therein, and so, the miss would not entail an access to DRAM 216 instead.

In this manner, data for data-dependent load instructions may be prefetched by identifying the instruction slice for the data-dependent load instruction and pre-executing the instruction slice. Accordingly, the penalties which may be incurred if the data for the data-dependent load instruction were to miss in the last-level cache such as L3 cache 210, may be avoided.

Figure 5:
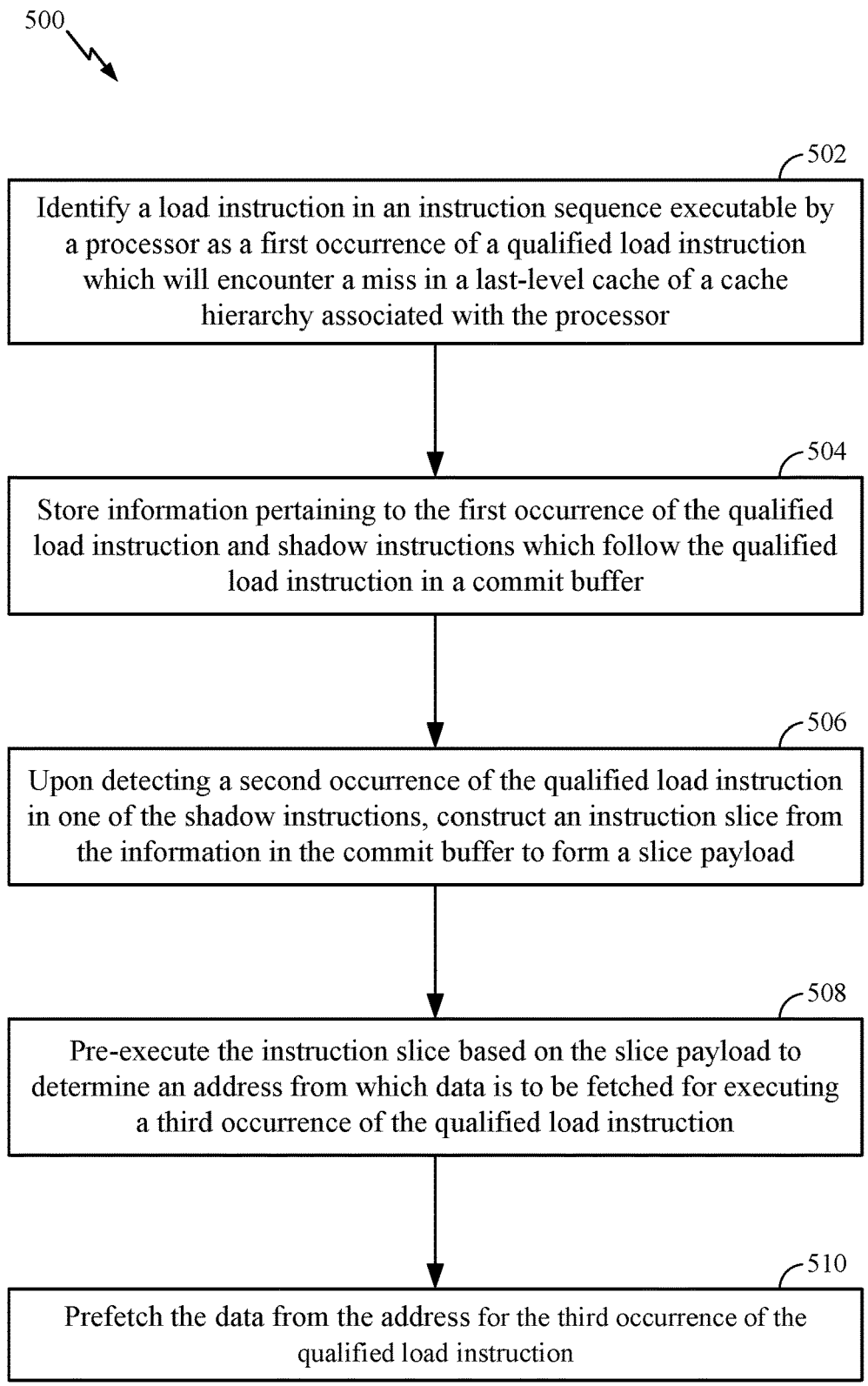
FIG. 5 illustrates a method instruction processing with slice construction, according to aspects of this disclosure.

Accordingly, it will be appreciated that exemplary aspects include various methods for performing the processes, functions and/or algorithms disclosed herein. For example, FIG. 5 illustrates a method 500 of instruction processing (e.g., according to the example sequences shown and described with reference to FIGS. 4A-F).

Block 502 comprises identifying a load instruction (e.g., instruction I6) in an instruction sequence (e.g., static code 402) executable by a processor (e.g., processor 202) as a first occurrence of a qualified load instruction (e.g., first iteration of instruction I6) which will encounter a miss in a last-level cache of a cache hierarchy associated with the processor (e.g., instruction I6 is a data-dependent load instruction).

Block 504 comprises storing information pertaining to the first occurrence of the qualified load instruction and shadow instructions which follow the qualified load instruction in a commit buffer (e.g., steps S3, S4, S5 for commit buffer 302 in FIG. 4A).

Block 506 comprises, upon detecting a second occurrence of the qualified load instruction in one of the shadow instructions, constructing an instruction slice from the information in the commit buffer (e.g., step S6 in FIG. 4B) to form a slice payload (e.g., to be stored in slice cache 207).

Block 508 comprises, for a third occurrence of the qualified load instruction, pre-executing the instruction slice (e.g., in pre-execution engine 218) based on the slice payload, to determine an address from which data is to be fetched for executing the third occurrence of the qualified load instruction.

Block 510 comprises prefetching the data from the address for the third occurrence of the qualified load instruction (e.g., into a buffer in memory controller 216).

Figure 6:
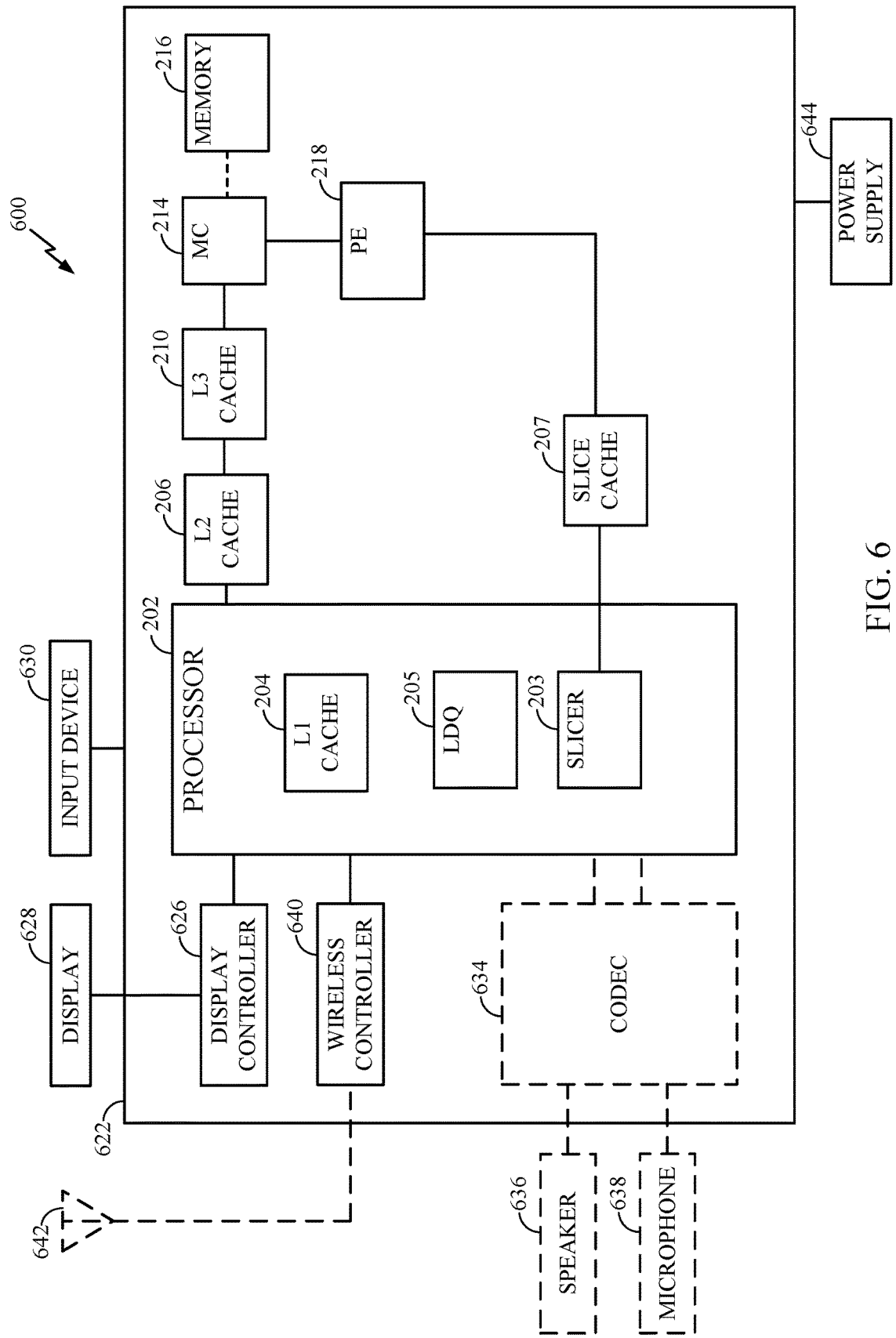
FIG. 6 depicts an exemplary computing device in which an aspect of the disclosure may be advantageously employed.

An example apparatus in which exemplary aspects of this disclosure may be utilized, will now be discussed in relation to FIG. 6. FIG. 6 shows a block diagram of computing device 600. Computing device 600 may correspond to an exemplary implementation of a processing system 200 of FIG. 2, wherein processor 202 may comprise slicer 203 configured to perform the methods shown and described with reference to FIGS. 4A-F, 5. In the depiction of FIG. 5, computing device 400 is shown to include processor 202 showing L1 cache 204, load queue 205 and slicer 203 shown in FIG. 3 along with slicer 203 coupled to slice cache 207, which is coupled to pre-execution engine 218. Processor 202 is also shown to be coupled to L2 cache 206, L3 cache 210, memory controller 214, pre-execution engine 218, and memory 216, which may be a DRAM (keeping in mind that some other details shown and described with reference to FIG. 2 have been omitted for the sake of clarity).

FIG. 6 also shows display controller 626 that is coupled to processor 202 and to display 628. In some cases, computing device 600 may be used for wireless communication and FIG. 6 also shows optional blocks in dashed lines, such as coder/decoder (CODEC) 634 (e.g., an audio and/or voice CODEC) coupled to processor 202 and speaker 636 and microphone 638 can be coupled to CODEC 634; and wireless antenna 642 coupled to wireless controller 640 which is coupled to processor 202. Where one or more of these optional blocks are present, in a particular aspect, processor 202, display controller 626, memory 632, and wireless controller 640 are included in a system-in-package or system-on-chip device 622.

Accordingly, a particular aspect, input device 630 and power supply 644 are coupled to the system-on-chip device 622. Moreover, in a particular aspect, as illustrated in FIG. 6, where one or more optional blocks are present, display 628, input device 630, speaker 636, microphone 638, wireless antenna 642, and power supply 644 are external to the system-on-chip device 622. However, each of display 628, input device 630, speaker 636, microphone 638, wireless antenna 642, and power supply 644 can be coupled to a component of the system-on-chip device 622, such as an interface or a controller.

It should be noted that although FIG. 6 generally depicts a computing device, processor 202 and memory 216, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for instruction processing including slice construction for pre-execution. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of instruction processing, the method comprising:

identifying a load instruction in an instruction sequence executable by a processor as a first occurrence of a qualified load instruction which will encounter a miss in a last-level cache of a cache hierarchy associated with the processor, wherein identifying the load instruction as a first occurrence of the qualified load instruction comprises determining that a number of cycles that the load instruction is waiting for load data in a load queue of the processor is greater than a number of cycles which will be incurred in servicing the load instruction from the last-level cache if there is a hit in the last-level cache for the load data;

storing information pertaining to the first occurrence of the qualified load instruction and shadow instructions which follow the qualified load instruction in a commit buffer;

upon detecting a second occurrence of the qualified load instruction in one of the shadow instructions, constructing an instruction slice from the information in the commit buffer to form a slice payload;

pre-executing the instruction slice based on the slice payload to determine an address from which data is to be fetched for executing a third occurrence of the qualified load instruction; and prefetching the data from the address for the third occurrence of the qualified load instruction.

2. The method of claim 1, further comprising storing a program counter (PC) of the first occurrence of the qualified load instruction in a concurrent slice list if the concurrent slice list does not contain the PC.

3. The method of claim 2, wherein the slice payload comprises one or more of the program counters (PCs), instruction encoding, input registers, or output registers of the first and second occurrences of the qualified load instruction and one or more other shadow instructions.

4. The method of claim 3 comprising detecting the second occurrence of the qualified load instruction based on detecting that the concurrent slice list comprises the PC of the second occurrence of the qualified load instruction.

5. The method of claim 4, further comprising creating one or more live-ins vectors for the instruction slice, walking backwards from the second occurrence of the qualified load instruction to the first occurrence of the qualified load instruction in an instruction buffer, wherein the one or more live-ins vectors comprise a set of live-ins, wherein the live-ins are input registers which are not produced as output registers by any of the instructions in the instruction slice.

6. The method of claim 5 wherein creating the one or more live-ins vectors comprises:
creating a load slice live-ins vector comprising live-ins for instructions which do not include branch or compare instructions in the instruction slice;
creating a branch slice live-ins vector comprising live-ins for instructions which include branch or compare instructions in the instruction slice; and
merging the load slice live-ins vector and the branch slice live-ins vector to generate a merged slice live-ins vector.

7. The method of claim 5, further comprising:
creating a load slice program counter (PC) vector comprising PCs for instructions which do not include branch or compare instructions in the instruction slice;
creating a branch slice PC vector comprising PCs for instructions which include branch or compare instructions in the instruction slice; and
merging the load slice PC vector and the branch slice PC vector to generate a merged slice PC vector.

8. The method of claim 7, wherein pre-executing the instruction slice comprises providing the merged slice live-ins vector and the merged slice PC vector as part of the slice payload to be stored in a slice cache, and for the third occurrence of the load instruction, upon detection that the slice cache comprises the slice payload, providing the slice payload to a pre-execution engine and executing instructions based on the slice payload in the pre-execution engine to determine the address.

9. The method of claim 8, comprising prefetching the data into a buffer coupled to the last-level cache, wherein the buffer is provided in a memory controller coupled to the last-level cache and configured to control access to an external memory system.

10. The method of claim 2, further comprising disabling the commit buffer if the concurrent slice list is empty.

11. The method of claim 2, wherein the concurrent slice list and the commit buffer are first-in-first-out (FIFO) buffers.

12. An apparatus comprising:
a processor configured to execute an instruction sequence;
a slicer of the processor configured to identify a load instruction in the instruction sequence as a first occurrence of a qualified load instruction which will encounter a miss in a last-level cache of a cache hierarchy associated with the processor, wherein the slicer is configured to identify the load instruction as a first occurrence of the qualified load instruction based on a determination that a number of cycles that load instruction is waiting in a load queue of the processor is greater than a number of cycles which will be incurred for the load instruction to be serviced from the last-level cache if there is a hit in the last-level cache for the load data;
a commit buffer configured to store information pertaining to the first occurrence of the qualified load instruction and shadow instructions which follow the qualified load instruction;
wherein the slicer is configured to, upon detection of a second occurrence of the qualified load instruction in one of the shadow instructions, construct an instruction slice from the information in the commit buffer to form a slice payload; and
a pre-execution engine configured to pre-execute the instruction slice based on the slice payload to determine an address from which data is to be fetched for execution of a third occurrence of the qualified load instruction; and
a memory controller configured to prefetch the data from the address for the third occurrence of the qualified load instruction.

13. The apparatus of claim 12, further comprising a concurrent slice list configured to store a program counter (PC) of the first occurrence of the qualified load instruction if the concurrent slice list does not contain the PC.

14. The apparatus of claim 13, wherein the slice payload comprises one or more of the program counters (PCs), instruction encoding, input registers, or output registers of the first and second occurrences of the qualified load instruction and one or more other shadow instructions.

15. The apparatus of claim 14, wherein the slicer is configured to detect the second occurrence of the qualified load instruction if the concurrent slice list comprises the PC of the second occurrence of the qualified load instruction.

16. The apparatus of claim 15, further comprising one or more live-ins vectors for the instruction slice, wherein the one or more live-ins vectors comprise a set of live-ins, wherein the live-ins are input registers which are not produced as output registers by any of the instructions in the instruction slice.

17. The apparatus of claim 16 wherein the one or more live-ins vectors comprises:
a load slice live-ins vector comprising live-ins for instructions which do not include branch or compare instructions in the instruction slice;
a branch slice live-ins vector comprising live-ins for instructions which include branch or compare instructions in the instruction slice; and
a merged slice live-ins vector comprising the load slice live-ins vector merged with the branch slice live-ins vector.

18. The apparatus of claim 17, further comprising:
a load slice program counter (PC) vector comprising PCs for instructions which do not include branch or compare instructions in the instruction slice;
a branch slice PC vector comprising PCs for instructions which include branch or compare instructions in the instruction slice; and
a merged slice PC vector comprising the load slice PC vector merged with the branch slice PC vector.

19. The apparatus of claim 18, wherein the pre-execution engine is configured to pre-execute the instruction slice based on the merged slice live-ins vector and the merged slice PC vector to determine the address.

20. The apparatus of claim 19, wherein the memory controller comprises a buffer configured to store the prefetched data.

21. The apparatus of claim 13, wherein the commit buffer is configured to be disabled if the concurrent slice list is empty.

22. The apparatus of claim 13, wherein the concurrent slice list and the commit buffer comprise first-in-first-out (FIFO) buffers.

23. A non-transitory computer-readable medium comprising code, which, when executed by a computer, causes the computer to perform operations for instruction processing, the non-transitory computer-readable medium comprising:
  code for identifying a load instruction in an instruction sequence executable by a processor as a first occurrence of a qualified load instruction, wherein the code for identifying the load instruction as a first occurrence of the qualified load instruction comprises code for determining that a number of cycles that the load instruction is waiting for load data in a load queue of the processor is greater than a number of cycles which will be incurred in servicing the load instruction from the last-level cache if there is a hit in the last-level cache for the load data;
  code for storing information pertaining to the first occurrence of the qualified load instruction and shadow instructions which follow the qualified load instruction in a commit buffer;
  code for, upon detecting a second occurrence of the qualified load instruction in one of the shadow instructions, constructing an instruction slice from the information in the commit buffer to form a slice payload;
  code for pre-executing the instruction slice based on the slice payload to determine an address from which data is to be fetched for executing a third occurrence of the qualified load instruction; and
  code for prefetching the data from the address for the third occurrence of the qualified load instruction.

24. The non-transitory computer-readable medium of claim 23, further comprising code for storing a program counter (PC) of the first occurrence of the qualified load instruction in a concurrent slice list if the concurrent slice list does not contain the PC.

25. The non-transitory computer-readable medium of claim 24, wherein the slice payload comprises one or more of the program counters (PCs), instruction encoding, input registers, or output registers of the first and second occurrences of the qualified load instruction and one or more other shadow instructions.

26. The non-transitory computer-readable medium of claim 25 comprising code for detecting the second occurrence of the qualified load instruction based on code for detecting that the concurrent slice list comprises the PC of the second occurrence of the qualified load instruction.

27. An apparatus comprising:
  means for identifying a load instruction in an instruction sequence executable by a processor as a first occurrence of a qualified load instruction, wherein the means for identifying the load instruction as a first occurrence of the qualified load instruction comprises means for determining that a number of cycles that the load instruction is waiting for load data in a load queue of the processor is greater than a number of cycles which will be incurred in servicing the load instruction from the last-level cache if there is a hit in the last-level cache for the load data;
  means for storing information pertaining to the first occurrence of the qualified load instruction and shadow instructions which follow the qualified load instruction;
  means for, upon detecting a second occurrence of the qualified load instruction in one of the shadow instructions, constructing an instruction slice from the information in the means for storing to form a slice payload;
  means for pre-executing the instruction slice based on the slice payload to determine an address from which data is to be fetched for executing a third occurrence of the qualified load instruction; and
  means for prefetching the data from the address for the third occurrence of the qualified load instruction.

* * * * *